May 12, 1925.

W. JACOBS

THRASHER

Original Filed May 2, 1921 4 Sheets-Sheet 1

1,537,305

INVENTOR
Winfred Jacobs.
BY
ATTORNEY

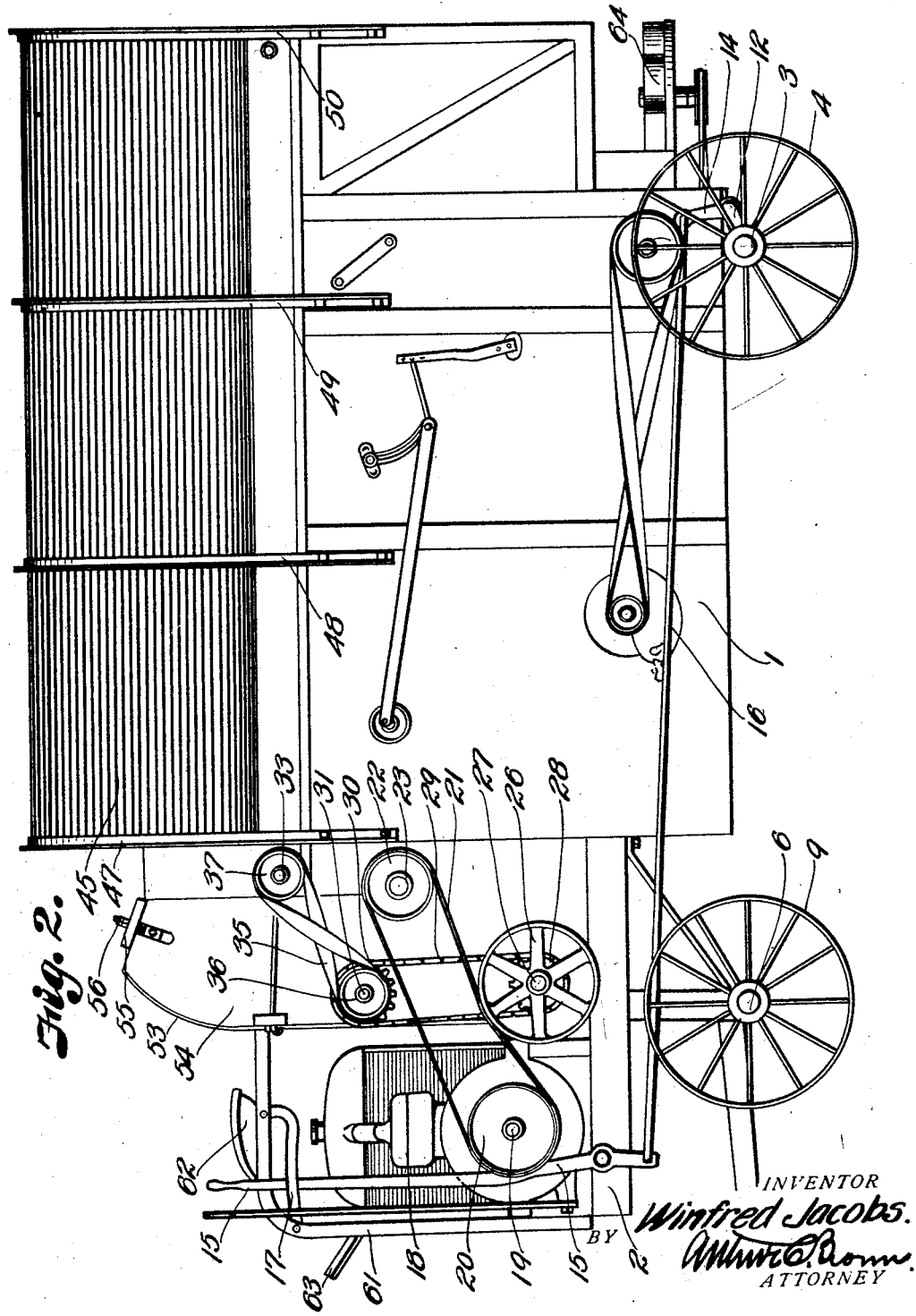

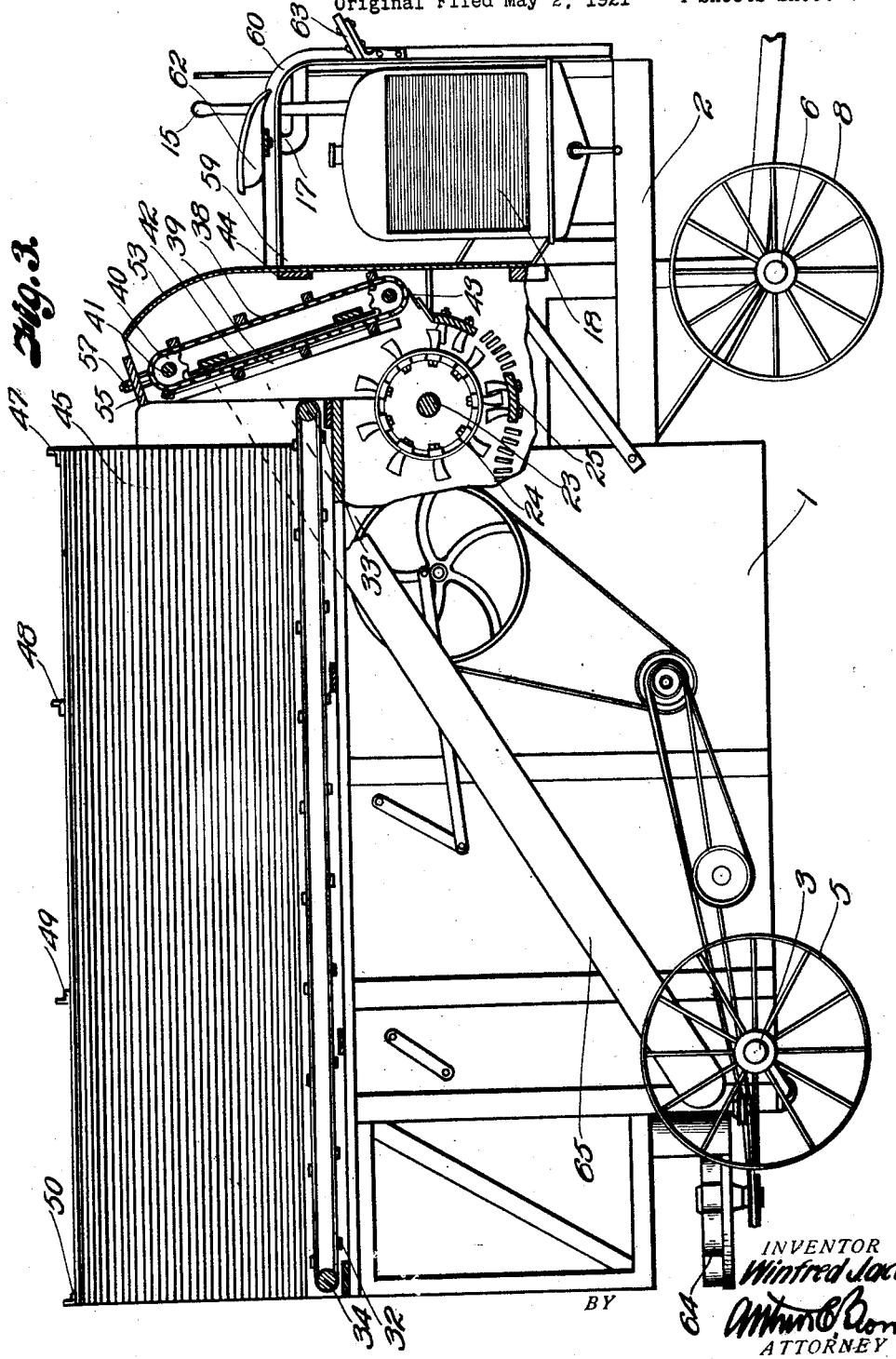

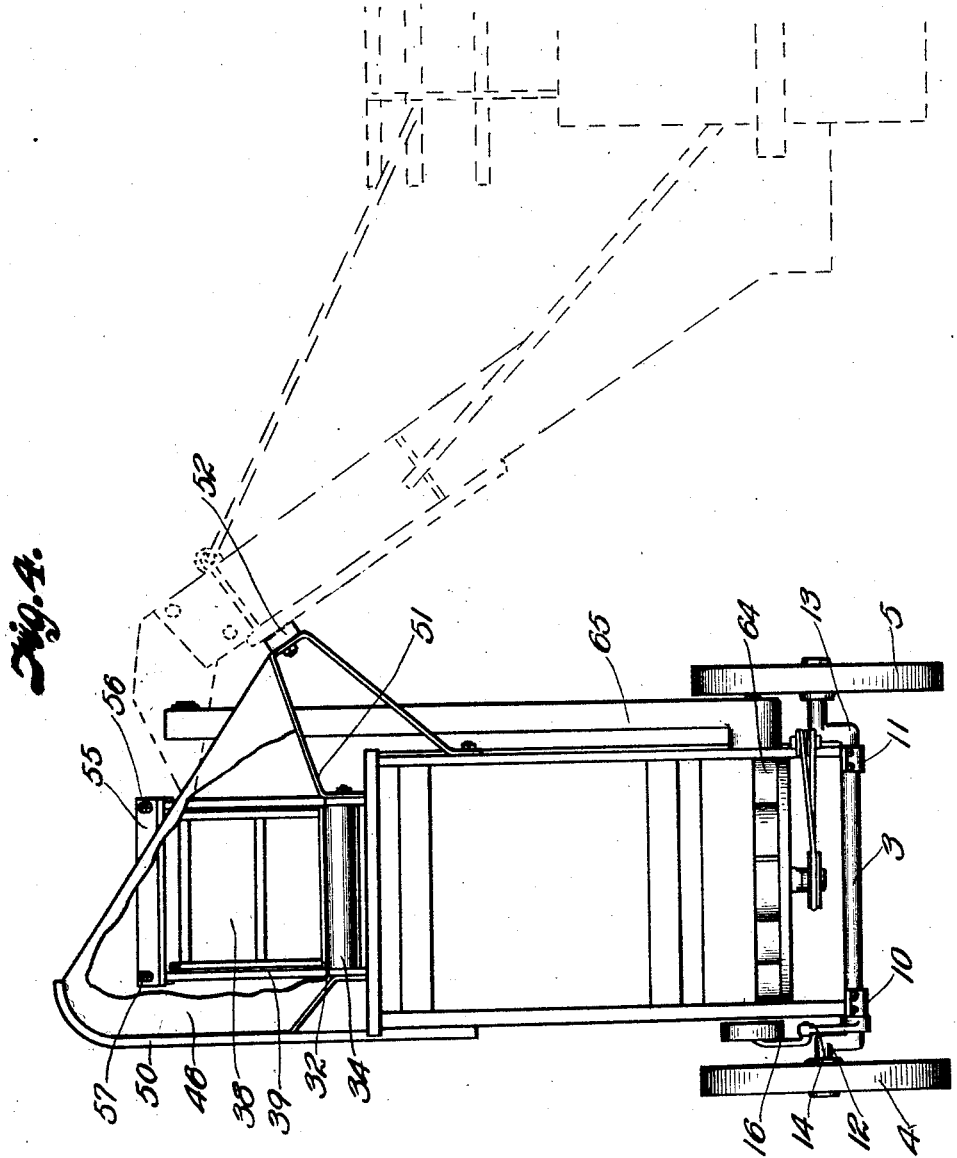

Patented May 12, 1925.

1,537,305

UNITED STATES PATENT OFFICE.

WINFRED JACOBS, OF DODGE CITY, KANSAS, ASSIGNOR TO AVERY COMPANY, OF PEORIA, ILLINOIS, A CORPORATION OF ILLINOIS.

THRASHER.

Application filed May 2, 1921, Serial No. 466,171. Renewed October 25, 1924.

*To all whom it may concern:*

Be it known that I, WINFRED JACOBS, a citizen of the United States, residing at Dodge City, in the county of Ford and State of Kansas, have invented certain new and useful Improvements in Thrashers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to thrashing machines and one of the objects of the invention is to provide a thrashing machine which is capable of functioning as such independently of any other auxiliary mechanism but which is also adapted when expedient to serve as an element of a combined harvester and thrasher.

I am aware that thrashing machines and reapers or harvesters have been combined in a single unitary structure prior to my invention but such machines are uneconomical for the following reasons:

A combined harvester and thrasher can be used successfully only when the grain is ripe because the grain passes directly from the harvester to the thrasher and in the event that the grain is not hard enough, the thrasher cannot perform its work. Therefore, if the farmer has a very large field of grain, he usually harvests some of it and stacks it, using the combined machine during the period between the time that the grain is ripe and the time that it will fall from the heads. After the combined machine is used, the stacked grain is then thrashed.

According to my invention, the thrasher may or may not co-operate with the harvesting machine. For example, if the grain is to be cut when it is first ripened and before it is dry enough to store, the harvester or header may perform its work in the usual way and the cut grain may be stacked, ready to be subsequently thrashed. For the short period when the grain is ripe and dry enough to store, the thrasher can be combined with the harvester so that the advantage of the "combined" machine consisting of a harvester and a thrasher may be had.

To elucidate, the invention consists of a conventional form of harvester and an improved type of thrasher, the harvester being capable of performing its work in the usual way as a harvesting machine and the thrasher being capable of performing its work as a thrasher or equally applicable to be combined with the harvesting machine so that a combined machine can be provided.

The invention involves a novel form and construction of thrashing machine, one form of which will be described hereinafter, reference being had to the accompanying drawings, in which Fig. 1 is a perspective view of a thrashing machine unit constructed in accordance with my invention.

Fig. 2 is a side elevational view of the same.

Fig. 3 is a side elevational view on the side opposite to that shown in Fig. 2, parts being broken away to show the cylinder and concave, part of the feed conveyor and part of the raddle or upright conveyor, and Fig. 4 is an end view of the machine.

Figure 1:
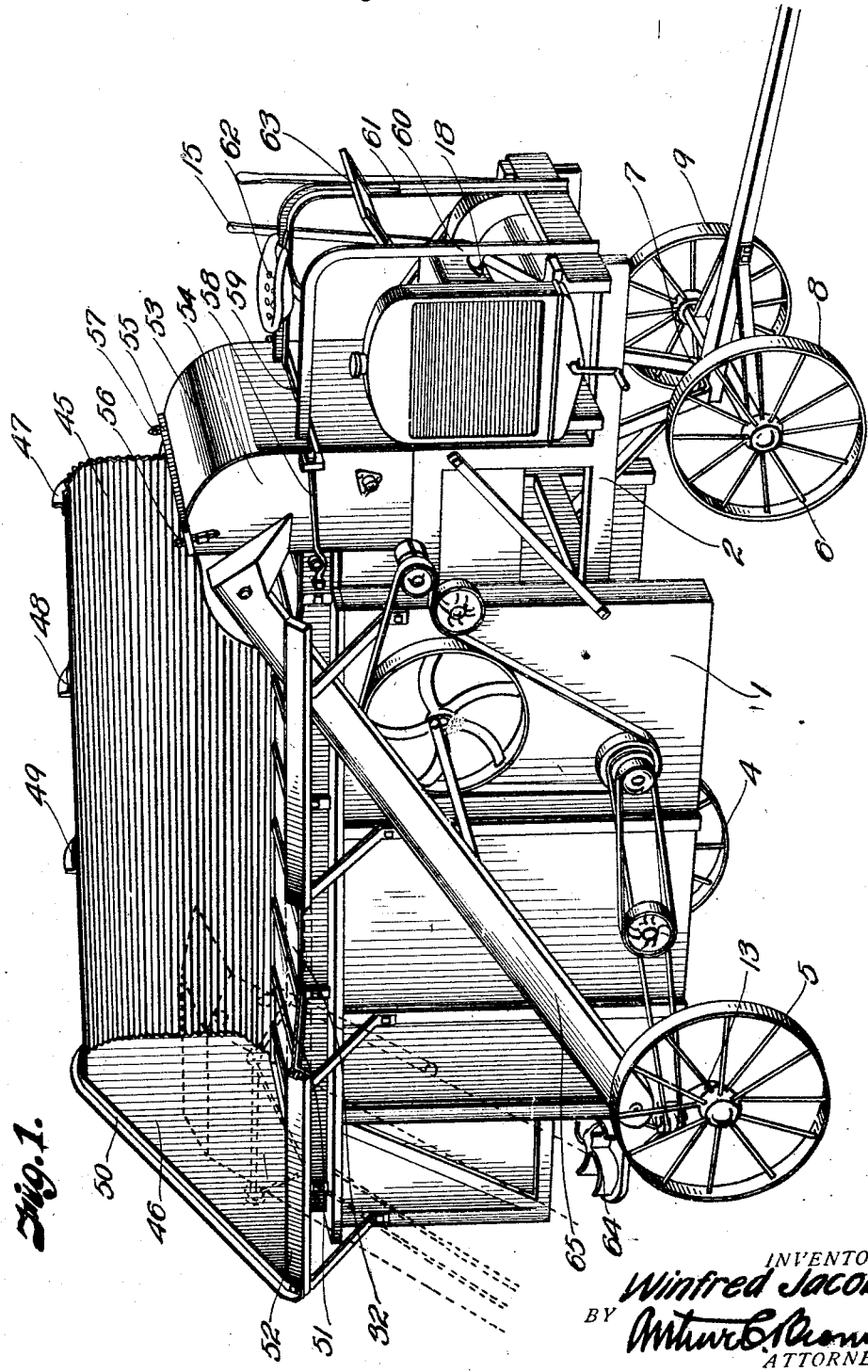

The harvester is shown as comprising a main body portion 1 provided with a front frame structure 2, the rear of the main body portion 1 being supported upon an axle 3 and supported by wheels 4 and 5 and the forward portion being provided with an axle 6, pivoted by a king bolt 7 and having wheels 8 and 9. The main body portion 1 constitutes a housing for the conventional elements of the thrasher, such as the separator screen, the fan blower and the like.

The axle 3 is supported in bearings 10 and 11 on the rear portion of the main body 1 and it is provided with cranks 12 and 13, on which the wheels are mounted, there being an arm or crank 14 on the axle 3 connected to an operating lever 15 at the front end of the machine through the medium of a rod or link 16 so that the axle 3 can be rotated about its axis to raise and lower the cranks 12 and 13 and thereby change the angle of inclination of the body portion 1 for ground or surfaces of different angles. For example, in passing up hill, the cranks will be turned so that the rear end of the body portion 1 is elevated to maintain the elements therein substantially level and in passing down hill, the reverse operation will take place. The lever 15 can be held in any adjusted position through the medium of a pawl and ratchet mechanism, generically designated 17.

The frame portion 2 at the front of the machine is shown as constituting a support for an engine or motor 18, which may be of any construction and which is provided with a shaft 19, on which is a pulley 20 constituting a power pulley and driving a belt 21, which passes around a pulley 22 on the shaft 23 on which the cylinder 24 is mounted. The cylinder may be of any convenient construction and will co-operate with a concave 25 in the usual manner. It is to be understood that the grain will pass from the cylinder and concave onto the separating rack and be subjected to the usual thrashing operation.

The belt 21 is shown as passing over and in frictional contact with the periphery of a pulley 26 (see Fig. 2) on a shaft 27, which carries a sprocket 28 driving a sprocket chain 29 which passes around a sprocket 30 on a shaft 31 constituting a drive shaft for a vertical feed belt or raddle in front of the horizontal conveyor belt 32, the latter of which passes around its drive shaft 33 and around an idler 34. The drive shaft 33 is driven by a belt 35, which passes over the pulley 36 on the shaft 31 and over a pulley 37 on the shaft 33, as clearly seen in Fig. 2.

The vertical conveyor or raddle is shown as consisting of links 38 connected together and guided by angle guides 39 so that in the event that the links 38 of the conveyor belt break, they will be guided against contact with the cylinder teeth so that the danger of drawing them into the concave will be eliminated.

The belt consisting of the links 38 passes over idler sprockets 40 on a shaft 41, as clearly seen by reference to Fig. 3, there being a partition baffle or plate 42 in front of the guides to assist in directing the grain into the cylinder and concave.

43 is a bridge or baffle plate below the lower end of the raddle or the feed belt so as to direct the grain into the cylinder and the parts are so co-related that a forced feed will be provided for the grain to direct it into the cylinder and prevent its choking at this point.

In front of the guides 42 is a plate or baffle 44 which will prevent the grain from passing beyond the feed belt and will help to direct it into the cylinder and concave.

By reference to Figs. 1 and 3, it will be observed that the conveyor belt 32 extends substantially the length of the machine and in a horizontal plane.

To one side of the housing or casing 1 is an upstanding, curved wall or baffle 45, which also extends the length of the machine and is provided at the rear end with an end wall 46, the baffle and rear end being supported by braces 47, 48 and 49 for the baffle and a brace 50 for the end wall 46. These braces may consist of angle, T-irons or channels but they are here shown as consisting of angle irons.

The conveyor belt 32 is substantially the width of the casing or body portion 1 and along the edge opposite to the baffle 45 is a receiving table or ledge consisting of an outstanding plate 51, having a longitudinally extending bar or flange 52 thereon, the ledge or support 51 being for the purpose of receiving the grain from the harvesting machine, such as, for example, the header. It will be observed that the plate or ledge 51 and the baffle 45 in effect constitute a hood or hopper to receive the grain from the harvesting machine and the purpose of extending the same substantially the entire length of the machine is to allow for relative movement of the delivery end of the harvesting machine with respect to the conveyor 32 because when the thrashing machine is hitched to the harvesting machine, there will be relative swinging movement of the delivery end of the harvester with respect to the thrashing machine and I have, therefore, provided ample space for this movement to take place.

The form of hitch and the construction of the harvesting machine are not illustrated in detail in this application because any appropriate form of hitch may be employed and I do not wish to be limited to any particular type of harvesting machine, the invention consisting rather in the idea of providing two separable units, one a harvester and the other a thrasher, which can be brought together to co-operate in the novel arrangement of the thrashing machine, one form of which I have illustrated in the accompanying drawings.

In front of the raddle or feed belt 38 is a guard plate 53, which is part of a superstructure or casing 54, which encloses the raddle or feed conveyor and said superstructure is shown as provided with a bar 55, having adjusting screws 56 and 57, in which the shaft 41 is mounted so that tension on the belt may be provided.

The superstructure also supports the shaft 31 and it is held in position by a yoke consisting of the spring side bars 58 and the cross bars 59, as clearly seen in Fig. 1.

The seat supporting bars 60 and 61 may be provided over the engine, as shown in Fig. 1 to support a seat 62, there being also a foot rest 63 provided.

The thrasher may be equipped with a rotary straw spreader 64, appropriately driven from the operating mechanism of the thrashing machine.

Attention is called to the fact that the thrasher may have the usual tailings conveyor 65, which will re-deliver the tailings to the cylinder and concave to be worked over again, this being well understood in the thrashing machine art.

From the foregoing it will be apparent that the harvesting machine may be operated in the usual way independently of the thrasher to harvest the ripe grain which has not yet become hard enough to be stored, so that this grain can be stacked for subsequent thrashing but that the same harvesting machine may be combined with the thrashing machine so that the two may constitute, when properly coupled together, a combined harvester and thrasher so that the thrashing machine will have a receiving portion consisting of a hood or hopper of sufficient length or with an opening extensive enough to permit the swing or vibrating action of the delivery end of the harvesting machine so that the harvested grain may be conveniently received and delivered to the cylinder and concave and pass through the harvesting machine in the usual manner.

It will also be apparent that when expedient, the harvesting machine may be detached from the thrashing machine and the thrasher can be used to perform its function alone, irrespective of the harvester.

Therefore, with the two units adapted to be properly co-related and detached one from the other, every practical condition can be met; that is, the grain can be harvested without immediately thrashing, or harvested and thrashed at the same time, or the thrasher can perform its function quite independent of interference in any way by the harvester.

In actual practice the thrasher may be propelled by one means and the harvester by another, but, of course, the harvester must follow closely along with the thrasher as the two units move through the field.

The elongated opening in the side of the hopper or hood at the top of the thrasher will allow for the relative movements between the thrasher and the delivery end of the harvester as the two machines are operating and the projecting ledge or table at the receiving end of the hopper or hood will allow for relative lateral movement between the delivery end of the harvester and the receiving end of the thrasher, it being obvious that it will be impossible in actual practice to maintain relatively fixed positions with respect to the delivery end of the harvester and the receiving end of the thrasher.

Attention is also called to the fact that the vertical feed belt extends above the delivery end of the horizontal delivery conveyor running the length of the thrasher. Therefore, when the heads are delivered from the horizontal belt they will be squeezed in the space between the delivery end of the horizontal belt and the intermediate portion of the vertical belt so that a positive feed will be provided. This is an important feature of my invention.

What I claim and desire to secure by Letters-Patent is:

1. In a thrashing machine, the combination of a casing having an opening in its top, thrashing devices within the casing, a conveyor extending longitudinally of the casing beneath the opening in the top thereof and adapted to deliver material to be thrashed to the thrashing devices, a shelf extending lengthwise of the opening in the top of the casing and projecting laterally therefrom, and a guard extending upward from the opposite side of the opening in the top of the casing and projecting laterally over said opening.

2. In a thrashing machine, the combination of a casing having an opening in its top, thrashing devices within the casing, a conveyor extending longitudinally of the casing beneath the opening in the top thereof and adapted to deliver material to be thrashed to the thrashing devices, and an imperforate guard extending upward from one side of the opening in the casing top and projecting laterally across said opening at a suitable elevation to provide an elongated inlet.

3. In a thrashing machine, the combination of a casing having an opening in its top, thrashing devices within the casing, a conveyor extending longitudinally of the casing beneath the opening in the top thereof and adapted to deliver material to be thrashed to the thrashing devices, a guard extending upward along the rear end and one side of the opening in the top of the casing, the side portion of said guard being deflected laterally over the opening, and a plurality of braces extending upward from the casing and secured to said guard.

4. In a thrashing machine, the combination of a casing having an opening in its top, thrashing devices within the casing adjacent one end thereof, a conveyor extending longitudinally of the casing beneath the opening in the top thereof and adapted to deliver material to be thrashed to the thrashing devices, a shelf extending laterally from one side of the opening in the casing top and inclined upward from its inner to its outer edge, the said outer edge having a downward and outwardly inclined portion, and a guard extending upward from the side of the opening in the casing top opposite that from which said shelf extends.

5. In a thrashing machine, the combination of a casing having an opening in its top, a thrashing cylinder and concave within the casing, adjacent the forward end thereof, a conveyor extending longitudinally of the casing beneath the opening in the top thereof with its discharge end above the cylinder, and a feed belt in front of the conveyor and cylinder and extending from above the conveyor to below the upper horizontal plane of the cylinder, for the purpose described.

6. In a thrashing machine, the combination of a casing having an opening in its top, a thrashing cylinder and concave within the casing, adjacent the forward end thereof, a conveyor belt extending longitudinally of the casing beneath the opening in its top, the forward, delivery, end of said belt projecting over the thrashing cylinder, and a feed belt in front of the thrashing cylinder and the delivery end of the conveyor belt, said feed belt extending above the conveyor belt and cooperating therewith to feed grain to the thrashing cylinder and concave.

7. In a thrashing machine, the combination of a casing having an opening in its top, a thrashing cylinder and concave within the casing, adjacent the forward end thereof, a conveyor belt extending longitudinally of the casing beneath the opening in its top, the forward, delivery, end of said belt projecting over the thrashing cylinder, and a feed belt in front of the conveyor belt, and extending in an upward and rearwardly inclined direction from points in front of and below the upper horizontal plane of the cylinder to points above the conveyor belt.

8. In a thrashing machine, the combination of a casing having an opening in its top, a thrashing cylinder and concave within the casing, adjacent the forward end thereof, a conveyor belt extending longitudinally of the casing beneath the opening in its top, the forward, delivery, end of said belt projecting over the thrashing cylinder, an endless feed belt in front of the conveyor belt and extending from points in advance of and below the upper horizontal plane of the cylinder to points above the conveyor belt, and a baffle arranged between the runs of the feed belt directly in front of the delivery end of the conveyor belt.

In testimony whereof I affix my signature.

WINFRED JACOBS.